US011279363B2

(12) United States Patent
Geiger et al.

(10) Patent No.: US 11,279,363 B2
(45) Date of Patent: Mar. 22, 2022

(54) METHOD FOR CONTROLLING A DRIVE DEVICE OF A CONSTRUCTION MACHINE

(71) Applicant: ZF Friedrichshafen AG, Friedrichshafen (DE)

(72) Inventors: Simon Geiger, Oberteuringen (DE); Matthias Madlener, Hohentengen (DE); Stephan Schinacher, Egesheim (DE); Matthias Duller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/822,910

(22) Filed: Mar. 18, 2020

(65) Prior Publication Data

US 2020/0298860 A1  Sep. 24, 2020

(30) Foreign Application Priority Data

Mar. 21, 2019 (DE) ...................... 10 2019 203 897.2

(51) Int. Cl.
*B60W 30/18* (2012.01)
*F16H 61/16* (2006.01)
(Continued)

(52) U.S. Cl.
CPC ...... *B60W 30/18181* (2013.01); *B60W 10/06* (2013.01); *B60W 10/11* (2013.01);
(Continued)

(58) Field of Classification Search
CPC .......... B60W 30/18181; B60W 10/06; B60W 10/11; B60W 2300/17; B60W 2710/0644;
(Continued)

(56) References Cited

U.S. PATENT DOCUMENTS 9,097,344 B2   8/2015   Hoff et al.
9,694,679 B2 *   7/2017   Matsuzaki ........... B60K 28/165
(Continued)

FOREIGN PATENT DOCUMENTS

DE   20 2007 008 557 U1   12/2008
DE   10 2016 200 989 A1   7/2014
(Continued)

OTHER PUBLICATIONS

German Search Report Corresponding to 10 2019 203 897.2 dated Dec. 5, 2019.

*Primary Examiner* — Tisha D Lewis
(74) *Attorney, Agent, or Firm* — Finch & Maloney, PLLC; Michael J. Bujold; Jay S. Franklin

(57) ABSTRACT

A method of controlling a drive device of a construction machine with a split transmission, which is at least coupled, at an input side, to a drive force source and, on the output side, with a drive range change transmission so as to set at least two shiftable drive ranges. The method includes a detection step (S1) for detecting drive dynamic requests for operation of the construction machine and a determination step (S2) for determining whether a drive dynamic request with an increased drive dynamic is present. If a drive dynamic request with increased drive dynamics is determined, then a shifting step (S4) is executed for shifting the drive range change transmission from a second, of the at least two drive ranges, to a first of the at least two drive ranges, to achieve increased driving dynamics of the construction machine.

15 Claims, 4 Drawing Sheets

(51) Int. Cl.
   *F16H 37/00* (2006.01)
   *F16H 61/18* (2006.01)
   *B60W 10/06* (2006.01)
   *B60W 10/11* (2012.01)
   *E02F 9/20* (2006.01)
   *E02F 3/28* (2006.01)

(52) U.S. Cl.
   CPC ............ *E02F 9/202* (2013.01); *E02F 9/2066* (2013.01); *E02F 9/2079* (2013.01); *F16H 37/00* (2013.01); *F16H 61/16* (2013.01); *F16H 61/18* (2013.01); *B60W 2300/17* (2013.01); *B60W 2710/0644* (2013.01); *B60W 2710/1005* (2013.01); *B60Y 2200/415* (2013.01); *B60Y 2300/18183* (2013.01); *E02F 3/283* (2013.01); *F16H 2200/0034* (2013.01); *F16H 2200/0039* (2013.01); *F16H 2702/00* (2013.01)

(58) Field of Classification Search
   CPC ............ B60W 2710/1005; E02F 9/202; E02F 9/2066; E02F 9/2079; E02F 3/283; F16H 37/00; F16H 61/16; F16H 61/18; F16H 2200/0034; F16H 2200/0039; F16H 2702/00; B60Y 2200/415; B60Y 2300/18183
   See application file for complete search history.

(56) References Cited

U.S. PATENT DOCUMENTS

| | | | |
|---|---|---|---|
| 10,066,745 | B2 | 9/2018 | Geiger et al. |
| 2009/0005941 | A1* | 1/2009 | DeMarco ............ F16H 61/462 |
| | | | 701/51 |
| 2013/0041561 | A1 | 2/2013 | Asami et al. |
| 2017/0211694 | A1* | 7/2017 | Geiger ................ F16H 61/702 |

FOREIGN PATENT DOCUMENTS

| | | |
|---|---|---|
| DE | 11 2013 005 124 T5 | 8/2015 |
| DE | 10 2015 105 358 A1 | 10/2016 |

* cited by examiner

METHOD FOR CONTROLLING A DRIVE DEVICE OF A CONSTRUCTION MACHINE

This application claims priority from German patent application serial no. 10 2019 203 897.2 filed Mar. 21, 2019.

FIELD OF THE INVENTION

The invention concerns a method for controlling a drive device of a construction machine, as well as a construction machine to which the method is applied. In particular, the invention relates to a method for controlling a drive device of a construction machine, with which a driving dynamics requirement with an increased driving dynamics is taken into consideration.

BACKGROUND OF THE INVENTION

Construction machines are regularly used with a dynamic mode of operation. In particular with construction machines which are used for loading operations as, for instance, with wheel loaders, which are often being shifted between operation in the forward direction and a reverse direction. In addition, in the case of such construction machines, it is necessary to drive into a pile to pick up cargo, for example via a shovel mounted on the construction machine. This results in greatly differing driving dynamics requirements during operation of the construction machine.

So far, the various requirements placed on the driving dynamics of the construction machine have been taken into account by the operating mode, which are mainly specified by the driver. Due to the technical conditions of the drive devices currently used in construction machines, however, problems arise when considering the requirements for the driving dynamics of the construction machine due to the mode of operation.

SUMMARY OF THE INVENTION

The invention addresses the above problem and provides a method for controlling a drive device of a construction machine. Hereby, the method can be applied to a construction machine with a power-split transmission. At least one driving power source can be coupled to the power-split transmission on the input side and a driving range change transmission can be coupled on the output side for setting at least two switchable driving ranges.

The method can have the following steps: a collection step to capture drive dynamic requirements for the operation of the construction machine and a determination step to determine if a drive dynamic request with an increased drive dynamic is present. Hereby, in a determination that a drive dynamic request with an increased drive dynamic is present, a shifting step can be executed for shifting the drive range change transmission from a second of the at least two drive ranges to a first of the at least two drive ranges. Hereby, an increased drive dynamic of the construction machine can be achieved.

Basically, power-split transmissions can also designed as a single-range transmission instead of a two or multi-range transmission. Thus, the drive range changes are omitted in such designs. In particular, when electric drives are applied, single-range transmissions can be advantageously used, whereby the method, regarding the consideration of a drive dynamic request, is equally applied. However, due to the moments of inertia of the electric drives, an adaptation of the drive dynamic (in advance) can be required to, for instance, avoid an overload or an impermissible wheel slip (spinning of the wheels).

In addition, the method for controlling the drive device can also be applied in designs which have an electric drive without a power split.

It can be determined in the determination step that a driving dynamics requirement for an increased drive dynamic is present if a dynamic reduction of the drive speed of the construction machine is requested. This driving dynamics requirement with an increased drive dynamic can happen simultaneously with a reduction of the deflection of the gas pedal of the construction machine. Hereby, a dynamic reduction of the drive speed of the construction machine has to be separated from the reduction of the drive speed during a normal operation, in which an increased drive dynamic is not requested. In particular, a dynamic reduction of the drive speed comprises a deceleration of the construction machine which is achieved towing the drive device. Hereby, the dynamic reduction of the drive speed has to be separated also from a roll out of the construction machine during a reduction of the deflection or the release of the accelerator pedal of the construction machine.

In the second drive range, a lower gear ratio of the drive range transmission can be set than in the first drive range. Hereby, the dynamic reduction of the drive speed of the construction machine can be achieved through the shifting step with the executed shifting of the drive range transmission from the second drive range to the first drive range. Hereby, and to achieve the increased drive dynamic, the gear ratio can be increased between the drive wheels of the construction machine and the drive device. As a result, a braking effect can be used, for example, by the drive force source in the drive device in order to achieve the dynamic reduction in the driving speed.

When it is determined in the determination step that there is a driving dynamics request with excessive driving dynamics, a rotational speed of the driving force source can be controlled so that the speed does not fall below a limit speed. In this way, it can be ensured that the drive power source resides in a suitable operation range regarding the drive dynamic request. In particular, it can be ensured during a large load change that sufficient power is immediately available from the drive power source for the operation of the construction machine.

During the determination in the determination step that a drive dynamic request for an increased drive dynamic is present, the rotational speed of the drive power source can be controlled in a way during an overrun operation that the rotational speed decreases if the rotational speed is above the rotational speed limit. This design of the method allows the application of the deceleration effect to achieve the dynamic reduction of the drive speed. Hereby, the rotational speed limit can be designed as variable and adjustable in particular.

If it is determined in the determination step that there is no driving dynamics request with excessive driving dynamics, the drive device can be controlled in one step for operation with normal driving dynamics on the basis of a driving dynamics request with normal driving dynamics. The driving dynamics requirement with normal driving dynamics relates to an operating mode for which the drive device is designed in normal driving operation. In particular, a control strategy that differs from that used to achieve excessive driving dynamics is used for operating with normal driving dynamics for switching over the range-change transmission. When operating with normal driving dynamics, the deceleration of the construction machine when the deflection is reduced or when the accelerator pedal is released is less than when operating with excessive driving dynamics. This procedure ensures that the construction machine can be operated in accordance with the driving dynamics requirements.

During the determination step to determine if a drive dynamic request for an increased drive dynamic is present, it can be determined if a manual request for the operation for an increased drive dynamic is present. For this purpose, an actuator device can be provided at the construction machine which can be activated by a driver of the construction machine. The driver can hereby, based on his assessment, initiate by a manual request an operating condition with increased drive dynamic.

The manual request can result in the operation with increased drive dynamic being maintained as long as predetermined conditions are met. Through a further manual request, the operating conditions with an increased drive dynamic can be canceled. Alternatively or in addition to the further manual request, the operation with increased driving dynamics can be automatically canceled. For example, the operation with increased driving dynamics can be canceled by shifting into a different direction of travel of the construct machine.

In the determination step, the determination as to whether there is a drive dynamic request with increased driving dynamics can take place on the basis of the surroundings of the construction machine. Hereby, the surroundings of the construction machine can be detected via detection parts which can analyze the surroundings of the construction machine. In particular, optical detection parts, such as a camera, a laser system, or similar, can be applied. Also, radar systems or acoustical systems can be applied. It is possible through this recognition of the surroundings to recognize an upcoming drive dynamic request with increased drive dynamic. This can be for instance the case of recognizing a pile of material which is located, based on the drive direction, in front of the construction machine. Thus, it can be recognized by the surroundings recognition, prior to the driving into the material pile, that an operation with an increased drive dynamic has to be provided.

Hereby, the surroundings recognition can include detection of a predetermined impending force on the construction machine, which requires the construction machine to be operated with an increased driving dynamics. In particular, the impending force impact can be the drive into the material pile of the construction machine. This not only requires a dynamic reduction in driving speed, but also the preparation of the drive device with regard to the resulting force on the construction machine.

The impending action of force can include, in particular, an impending insertion of a material receiving element of the construction machine into a pile. The material receiving element can be a shovel mounted on the construction machine with which the material of the pile is to be picked up.

The driving dynamics requirement can be canceled by manual operation. As an alternative or in addition, the driving dynamics requirement can be canceled when a predetermined operating state of the construction machine is detected. After the lifting of the driving dynamics requirement with excessive driving dynamics, the construction machine is operated in an operating mode with normal driving dynamics. Alternatively or in addition, the drive dynamic request with an increased drive dynamic can also be canceled through the instruction of a direction change, a neutral requirement or if a minimum speed is determined to be undershot.

In addition, the construction machine is provided with a drive device which can have a power-split transmission. The drive device can furthermore have at least one drive power source coupled on the input side to the power-split transmission and one driving range change gear coupled on the output side to the power-split transmission for setting at least two switchable driving ranges. The construction machine also has a control device for controlling the drive device. The control device for carrying out the method is set up with one or more features, which is described above.

The construction machine can be designed as a wheel loader with wheels driven by drive device. The wheel loader can have a loading shovel for piercing into the pile to be picked up and for picking up material from the pile.

The drive power source can be designed as an internal combustion engine. In addition to the internal combustion engine, a hydraulic drive machine can be provided in the drive device. The hydraulic drive machine can be designed as a hydrostat. The drive device can also have one or more electrical machines. If an electrical machine is used as the driving force source, a torque control can be provided in order to generate a corresponding drag torque for the present application area. The electrical device can be operated by the control device.

The construction machine can also be a work machine which can be operated either with an increased driving dynamics or regular driving dynamics. The advantages result hereby in any type of construction machine, in which a dynamic reduction in driving speed is required and a subsequent application of force to the construction machine has to be taken into consideration.

BRIEF DESCRIPTION OF THE DRAWINGS

FIG. 4 shows a schematic presentation of elements of a drive device of the construction machine in an embodiment in which the method can be applied to.

DETAILED DESCRIPTION OF THE PREFERRED EMBODIMENTS

In the following and in reference to the drawings, embodiments of the present invention are described. First, the design of the construction machine is presented in which the invention can be applied to.

In the present embodiment, the construction machine (not shown) is designed as wheel loader. The wheel loader has driven wheels in a known art which are rotatably mounted on the chassis. In addition, the wheel loader has a bucket in the front part which can be lifted via a lifting mechanism. In addition, the wheel loader has a driver's cabin in which driver of the wheel loader controls the operation of the wheel loader.

Figure 4:
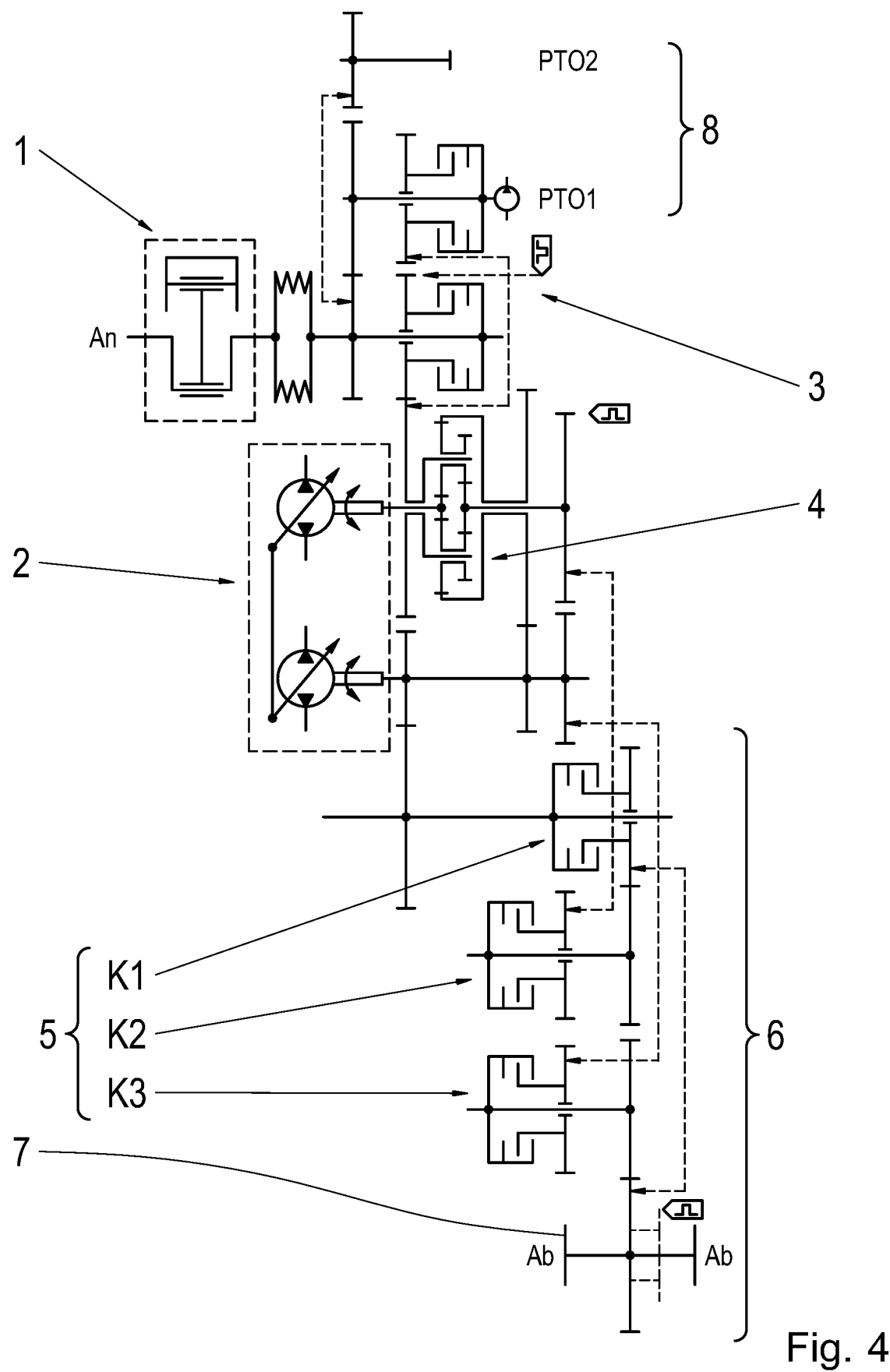

The schematic design of a drive device of the wheel loader is shown in FIG. 4. The drive device serves to drive the drive wheels of the wheel loader in order to move the wheel loader in a predetermined operating mode in the forward direction and in the reverse direction. As shown in FIG. 4, the drive device has a combustion engine 1 as the drive power source. The combustion engine 1 is connected to a power-split transmission 4 via a reversing gear transmission 3. The reversing gear transmission 3 serves to shift between a forward direction and a reverse direction. The power-split transmission 4 receives drive power from the combustion engine 1. In addition, a hydrostat 2 is connected with the power-split transmission 4. With this structure, a stepless change in a transmission ratio between an output element of the internal combustion engine 1 and an output element of the power-split transmission 4 is brought about in a known manner.

Due to the fact that the rotational speed range, which can be presented at the output side and the power-split transmission 4, is limited, the embodiment as shown in FIG. 4 presents a drive range change transmission 6. In the present embodiment, the drive range change transmission 6 has three drive ranges with different gear ratios which are made possible through predetermined gear ratios of gear wheels of the drive range change transmission 6. The drive range change transmission 6 has for each drive range a range change clutch K1, K2, and K3. A drive range of the drive range change transmission 6 is created through the range change clutches K1, K2, K3, which can be selectively engaged or disengaged. In the engaged condition of the range change clutch K1, a first drive range with a first gear ratio is created. Hereby, the additional range change clutches K2 and K3 are disengaged. In an engaged condition of the range change clutch K2, a second drive range is created which has a lower gear ratio than the first right range. Hereby, the range change clutches K1 and K3 are disengaged. In the engaged condition of the range change clutch K3, a third drive range is provided and its gear ratio is again lower than the second drive range. Hereby, the range change clutches K1 and K2 are disengaged.

An output element 7 is coupled with the drive range change transmission 6. At this output element 7, the created drive power can be withdrawn with a predetermined rotational speed. The output element 7 is connected with the element of a drive train of the wheel loader in such a way that the wheels of the wheel loader can be driven. For this purpose, the drive train of the wheel loader has a transfer case and differential gear in a known manner.

In addition, a power take-off 8 is provided at the drive device is shown in FIG. 4. The power take-off 8 serves hereby to drive extension elements or devices which require a drive.

The range change clutches K1-K3 of the drive range change transmission 6 are controlled by a hydraulic system. For this purpose, hydraulic oil with a predetermined pressure is introduced into or drained from the chambers of the range change clutches K1-K3 in order to bring about the engaged or disengaged state of the corresponding range change clutch.

The wheel loader has a control device which is designed to control the operation of the drive device. The control device has input interfaces, output interfaces and a memory unit to store data, as well as a processor unit.

The control device is supplied with parameters which were detected by the detecting devices which are mounted on the wheel loader. In particular, the output rotational speed of the drive device is detected which is equivalent to the drive speed of the wheel loader. In addition, an actual rotational speed of the combustion engine 1 is detected. The conditions of the drive range clutches K1-K3 are also detected and provided for the control device. The drive pedal position of the wheel loader is detected and the resulting parameters are supplied to the control device.

The wheel loader has also an activation element which is provided in addition to a steering wheel and control elements for the operation of the bucket and for the selection of the drive range and the drive direction.

In addition, a radar system is mounted on the wheel loader of the present embodiment which is oriented forward in the drive direction. The radar system is suitable to detect the surroundings of the area which is in front of the wheel loader. In particular, the radar system is set up to detect a pile of material located in front of the wheel loader. Hereby, the distance between the wheel loader, or respectively the bucket of the wheel loader, and the material pile is detected. The results of the detected parameters are provided to the control device.

The method for controlling the drive device according to one embodiment is explained below. For this purpose, the usual course of a charging process that is carried out with the wheel loader is first explained. The wheel loader is used to pick up loads from a pile of material. For this purpose, the wheel loader is moved in the direction of the material pile by drive force generated by the drive unit, while the bucket of the wheel loader is lowered. During the movement of the wheel loader in the direction of the material pile, the reduction of the drive speed is necessary so that the force during the insertion of the bucket of the wheel loader and the elements of the wheel loader is not excessive. A dynamic reduction of the drive speed is required for optimal efficiency.

After the drive speed of the wheel loader has been reduced accordingly, the bucket is driven into the material pile. As a result, the drive speed of the wheel loader is further reduced due to the force applied at the bucket. To pick up the load with the bucket, the wheel loader is driven into the load to be picked up with a high driving force requirement.

After the drive has progressed so far that the bucket is filled and can be lifted, the drive of the wheel loader is shifted from the forward direction to the reverse direction. This shift is generally carried out by the driver of the wheel loader by actuating the above mentioned actuating elements. The wheel loader is driven reverse with the loaded bucket to the desired place where the loaded material in the bucket can be unloaded. After unloading of the material from the bucket, the wheel loader is moved again in the direction of the material pile and the previously mentioned procedure is repeated.

Figure 1:
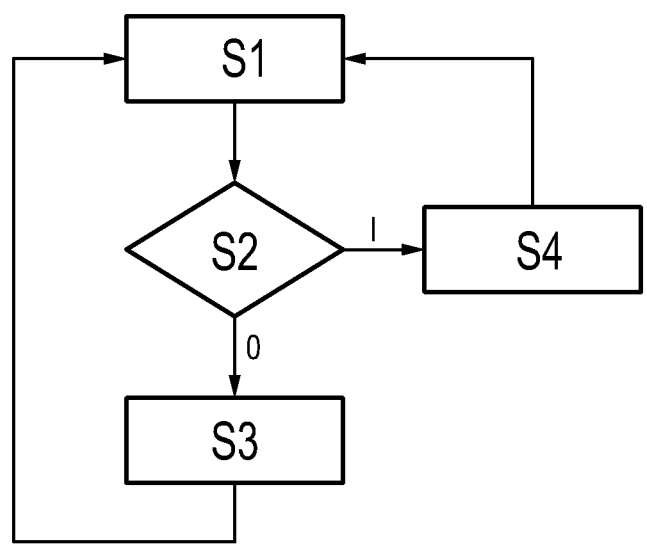
FIG. 1 shows steps in a flow chart which are executed in the method in accordance with an embodiment.

In accordance with the present embodiment, the method is executed through the control device and its steps are shown schematically in FIG. 1. The flow chart shown in FIG. 1 is continuously executed as soon as the wheel loader is in operation. In a detection step S1, it is determined which drive dynamic requirements are present for the operation of the wheel loader. In the present embodiment, the detected signal of the radar system is first analyzed. If the wheel loader is driven in the forward direction in an area in which the radar system does not detect a material pile which has to be loaded, the wheel loader is operated with a regular drive dynamic. This means that the drive device is operated based on the position of the gas pedal in such a way that the desired acceleration and drive speed is preferably efficiently accomplished. During an operation with regular drive dynamics, reduction of the gas pedal position reduces the rotational speed of the combustion engine 1 and none of the range change clutches K1-K3 of the drive range change transmission 6 are activated. In particular in a case in which during normal drive dynamics the gas pedal is completely released, a delay condition of the wheel loader occurs, which is described as roll out. In such a case, due to the construction of the drive device shown in FIG. 4, the deceleration of the wheel loader will be low, the range change gearbox 6 will have a low gear ratio, and the speed of the internal combustion engine 1 will be low.

As soon as the radar system detects a pile of material located in front of the wheel loader, it is determined at what distance the material pile is with respect to the bucket of the wheel loader. If the distance is below a predetermined minimal distance, the control device evaluates, in a determination step S2, that a drive dynamic requirement with increased drive dynamic is present.

In the present embodiment, the predetermined distance between the bucket and the material pile, which is the basis for the presence of the drive dynamic requirement with an increased drive dynamic, is variable and adjustable. In particular, the drive speed of the wheel loader is also evaluated in the determination step S2.

During the determination in the determination step S2 that a drive dynamic requirement with increased drive dynamic is present, a shifting step S4 is executed of the shifting of the drive range change transmission 6. Hereby, the drive range change transmission 6 is shifted in a way that it results in a larger gear ratio. If for instance, during the approach of the wheel loader towards the material pile, the second drive range is set by engaging the range change clutch K2, executing the shifting step S4 disengages the range change clutch K2 and engages the range change clutch K1, so that the first drive range of the range change transmission 6 is set up. As a result, deceleration of the wheel loader is increased by increasing the transmission ratio, in particular by utilizing the rotational inertia of the internal combustion engine 1 and other elements.

In the same context, the rotational speed of the combustion engine 1 is increased and it is at least made sure that the rotational speed of the combustion engine does not decrease below an adjustable threshold value. The consequence of this is that shortly before the bucket is inserted into the pile, the vehicle is already considerably decelerated and the drive power required by the wheel loader to drive the bucket further into the material pile is available immediately when the bucket is inserted.

When the insertion procedure is finished, i.e., when a load of the material is in the bucket, the driver will lift the bucket and reverse the direction of travel of the wheel loader using an activation element. The control device detects this reversal of direction and determines in the determination step S2 that the drive dynamic requirement with an increased drive dynamic is no longer present. Thus, the shifting step S4 is no longer executed, but step S3 of the flow chart which is shown in FIG. 1 is executed, which leads to the operation of the control device for the drive unit with a regular drive dynamic.

The invention offers several advantages which are briefly explained below. When using wheel loaders, efficiency is of high importance. In particular, the loaded mass per unit of time is a factor which has to be taken into consideration. With the present embodiment, it is possible to drive the wheel loader at high speed in the direction of the pile of material and to optimize the deceleration via the correspondingly configured dynamic operating mode. This alone reduces the needed drive time between the pile of material and the unloading location. In addition, according to the present embodiment, the drive unit is already prepared, before the insertion, for the requirements of the insertion into the aggregate matter. In particular the operating state of the drive device is set up before the insertion in such a way that sufficient torque is present at the wheels of the wheel loader without a shifting operation during the insertion. This is because shifting during the insertion procedure would eventually cause a standstill and this would therefore cost time.

Furthermore, it is possible with the present embodiment to use the drive device as shown in FIG. 4, which is based on the functionality of the power-split transmission 4 with the connected drive range change transmission 6. Usually, such drive devices are less suitable for dynamic applications than, for example, powershift transmissions or fully hydrostatic transmissions. By using the present method, however, such a drive device, as shown in FIG. 4, can also advantageously be used with a wheel loader.

Figure 2:
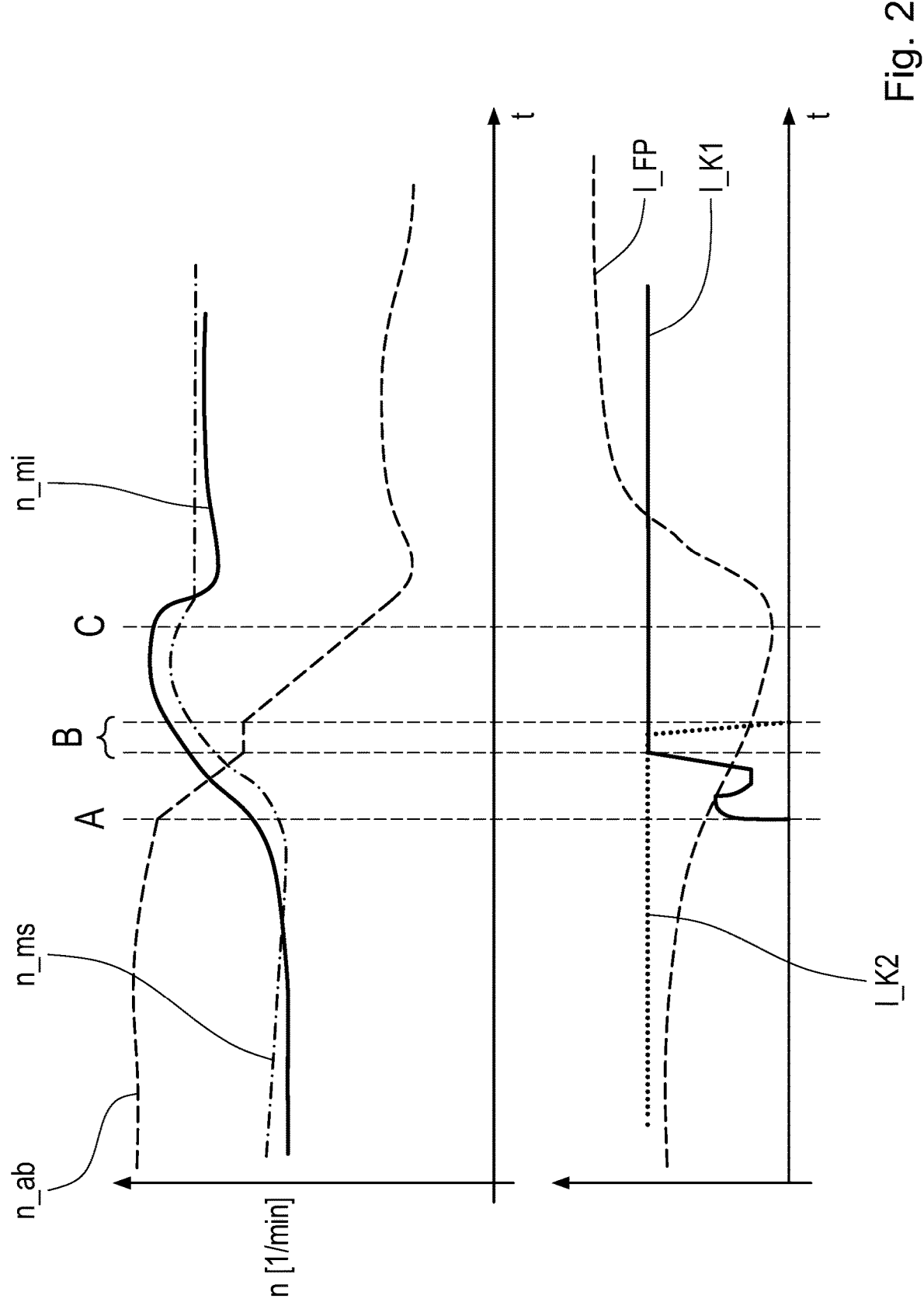
FIG. 2 shows a graph of various operating states of the construction machine in an exemplary time course.

FIG. 2 shows a graph of the timing sequence of different variables relevant to the operation of the wheel loader. The graphic shown in FIG. 2 illustrates the above described loading procedure which is executed with the wheel loader. At the starting point in time (on the left side in the graphic) the wheel loader moves towards the pile of material with a relatively high speed. This is indicated by a relatively high output rotational speed. The actual motor speed is, in this area, brought through the target motor rotational speed. In addition, the drive range clutch K2 is engaged so that the second drive range is selected. During the approach towards the material pile, the radar system recognizes it and, and at the time point marked with A, a shift of the drive range change transmission 6 is initiated. For this purpose, as can be seen in the lower area of the graphic, the range clutch K2 is disengaged, while the range clutch K1 is successively engaged. As a result, the change of driving range designated B is carried out.

The change of drive range hereby takes place in a necessary time interval, and as can be seen, the output rotational speed is kept mainly constant during the drive range change, which is due to the construction of the drive range change transmission 6 and the requirement of synchronization during the drive range change. At the time point C, the insertion of the bucket into the pile of material takes place. As can be seen in the presented sequence in FIG. 2, the drive dynamic requirement, viewed in terms of time, is clearly issued well before the insertion into the material pile. At the same time as the changeover of the driving mode, the target motor rotational speed of the embodiment as shown in FIG. 2, is increased by shifting of the clutches K2 and K1, so that the actual motor rotational speed follows the target motor rotational speed and is also increased.

As a result, sufficient power is available from the combustion engine 1 before the insertion. In addition, the drive range change transmission 6 is adjusted to a higher gear ratio so that more traction force is available for the wheels. Obviously, a drop in performance and in particular a sharp drop in the actual engine speed can be prevented by the control based on the method. At the same time, the wheel loader is braked strongly between the drive dynamic requirement and the actual insertion into the material pile.

Figure 3:
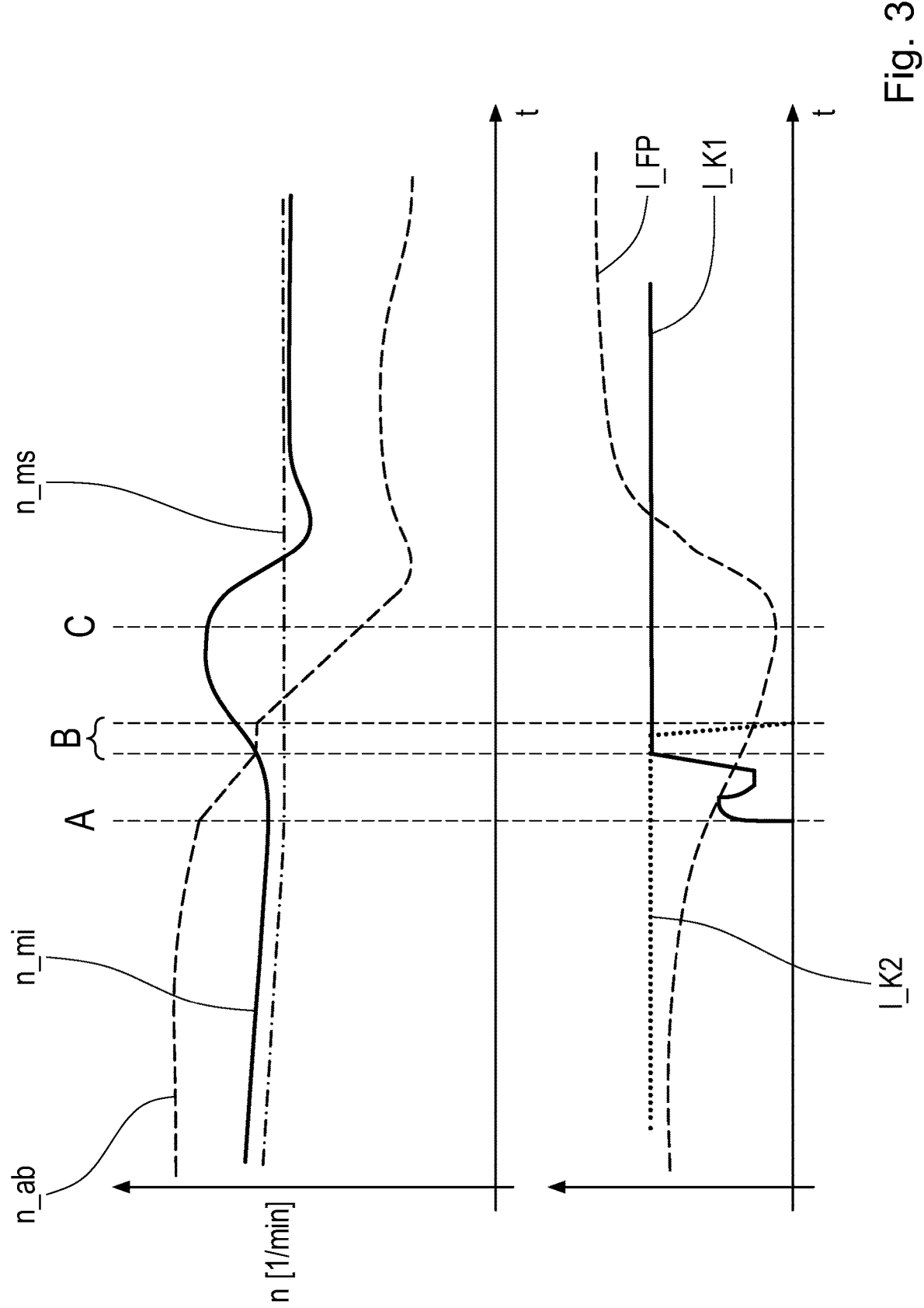
FIG. 3 shows a graph of various operating states of the construction machine in an additional, exemplary time course.

FIG. 3 shows a graphic in which the relevant variables are presented in their time sequence similar to that in FIG. 2. However, in this case, the target motor rotational speed is not increased when a drive dynamic requirement is present in this mode of operation, the target motor rotational speed has already, before the presence of the drive dynamic requirement, reached the upper threshold parameter so that, accordingly, the increase of the target motor rotational speed does not take place. It can be seen however, that also in this case the actual motor rotational speed is increased by shifting of the drive range in the drive range change transmission 6. As a result, a dynamic deceleration of the wheel loader is created, while the combustion engine 1 operates in overrun mode.

Modified Embodiments

In the above presented embodiment, the radar system is used to determine the approach of the wheel loader towards a pile of material. However, the recognition and the evaluation of the approach of the wheel loader towards the material pile can also be left for the driver, who can then manually actuate an actuating element for operation with increased drive dynamic. In the embodiment described above, the deceleration is brought about by the deceleration of the combustion engine 1. In a modified embodiment, in addition to the braking torque by the combustion engine 1, a service brake can be activated and controlled accordingly. In the above described embodiment, the combustion engine 1 is provided as the drive power source. In a modified embodiment, an electric machine is used instead of the combustion motor 1. In this embodiment the electric machine is then regulated through the control device torques, so that it results in the same functionality as in the previously described embodiments. In the previously described embodiment, the method is described for the use of the wheel loader in connection with the loading procedure. In modified embodiments, the method can be used with different kinds of work machines or construction machines, where a deceleration with a strong dynamics and high drive power is required with subsequent load changes, and the same advantages are achieved.

REFERENCE CHARACTERS

1 Drive Power Source
2 Hydrostat
3 Reversing Gear Transmission
4 Power-split Transmission
5 Clutch Unit
6 Driving Range Change Transmission
7 Output Element
8, PTO1, PTO2 Power Take-Off
A Time Point Requirement Shifting Driving Range Change Speed Transmission
B Drive Range Change
C Time Point Inject into Material pile
n Rotational speed
n_ab Output Rotational speed
n_mi Actual Motor Rotational speed
n_ms Target Rotational speed
I_FP Flow Drive Pedal/Drive Pedal Position
I_K1 Clutch Flow Range Change Clutch K1
I_K2 Clutch Flow Range Change Clutch K2
K1-K3 Range Change Clutch
S1 Collection Step
S2 Determination Step
S3 Operation with normal Drive Dynamics
S4 Shifting Step
I Drive Dynamic Requirement with increased drive dynamic is present
0 Drive Dynamic Requirement with increased drive dynamic is not present

The invention claimed is:

1. A method of controlling a drive device of a construction machine with a split transmission, which, on an input side, is coupled with at least a drive force source and, on an output side, is coupled with a driving range change transmission, to set at least two shiftable drive ranges, the method comprising:
   detecting drive dynamic requirements for operation of the construction machine during a detecting step,
   determining if a drive dynamic requirement with increased drive dynamic is present during a determination step,
   if a determination that the drive dynamic requirement with increased drive dynamic is present, executing a shifting step which shifts the driving range change transmission from a second, of the at least two drive ranges, to a first, of the at least two drive ranges, to achieve the increased drive dynamic of the construction machine, and
   upon determining, during the determination step, that the drive dynamic requirement with increased drive dynamic is present, controlling a rotational speed of the drive force source such that the rotational speed does not fall below a rotational speed limit.

2. The method according to claim 1, further comprising determining, during the determination step, that the drive dynamic requirement with increased drive dynamic is present if a dynamic reduction of a driven speed of the construction machine is required.

3. The method according to claim 2, further comprising selecting a lower gear ratio of the drive range change transmission, compared to a first drive range, the dynamic reduction of the driven speed of the construction machine is achieved through the executed shifting, during the shifting step, of the drive range transmission from the second drive range to the first drive range.

4. The method according to claim 1, further comprising upon determining, during the determination step, that there is the drive dynamic requirement with increased drive dynamic, controlling the rotational speed of the drive force source during an overrun operation such that the rotational speed is reduced when the rotational speed is above the rotational speed limit.

5. The method according to claim 1, further comprising upon determining, during the determination step, that the drive dynamic requirement with increased drive dynamic is not present, controlling the drive device, during an operation step, to operate with regular drive dynamics on a basis of a drive dynamic requirement with regular drive dynamic.

6. The method according to claim 1, further comprising upon determining, during the determination step, that the drive dynamic requirement with increased drive dynamic is present, determining if a manual request is present for operation with increased drive dynamic.

7. The method according to claim 1, further comprising, during the determination step, determining, on a basis of field conditions of the construction machine, if the drive dynamic requirement with increased drive dynamic is present.

8. The method according to claim 7, further comprising that the field condition comprises capturing of a predetermined, upcoming force impact on the construction machine, which requires operating of the construction machine with increased drive dynamic.

9. The method according to claim 8, further comprising that an upcoming force impact comprises an upcoming insertion of a material reception element of the construction machine into a material pile.

10. The method according to claim 1, further comprising canceling the drive dynamic requirement with increased drive dynamic by manual activation.

11. The method according to claim 1, further comprising canceling the drive dynamic requirement with increased drive dynamic when a predetermined operating condition of the construction machine is determined.

12. A construction machine with a drive device which has a split transmission, at least one drive power source coupled on an input side of the split transmission and the split transmission coupled on an output side thereof, with a drive range change transmission which has at least two shiftable drive ranges,
a control device being coupled to the drive device for controlling the drive device,
the control device being designed for executing a detecting step for detecting drive dynamic requirements for operation of the construction machine, and a determination step for determining if a drive dynamic requirement with increased drive dynamic is present, and upon a determination that the drive dynamic requirement with increased drive dynamic is present, executing a shifting step for shifting the driving range change transmission from a second of the at least two drive ranges to a first of the at least two drive ranges, to achieve the increased drive dynamic of the construction machine in which a higher gear ratio is engaged so that more traction force is available to wheels of the construction machine.

13. The construction machine according to claim 12, wherein the construction machine is designed as a wheel loader in which the drive device drives the wheels, and a loading bucket for penetration into a material pile which has to be transported.

14. The construction machine according to claim 12, further comprising that the drive power source is designed as a combustion engine.

15. A method of controlling, with a drive device, a construction machine having a power-split transmission that has an input side coupled to a source of drive power and an output side coupled to a driving range change transmission which is shiftable to at least first and second drive ranges, the method comprising:
detecting drive dynamic requirements for operation of the construction machine;
determining a presence of a drive dynamic requirement with increased drive dynamic; and
shifting the driving range change transmission from the second drive range to the first drive range to decrease a speed of the construction machine and achieve the increased drive dynamic of the construction machine in which a higher gear ratio is engaged in the power-split transmission so that more traction force is available to wheels of the construction machine and sufficient torque is present at the wheels of the construction machine without a shifting operation during the drive dynamic requirement with increased drive dynamic.

* * * * *